Dec. 19, 1961   H. E. CRUMRINE ET AL   3,013,346
XEROGRAPHIC APPARATUS

Filed May 7, 1959.   8 Sheets-Sheet 1

FIG. 1

INVENTOR.
Herbert E. Crumrine
Eugene T. Smith
BY
ATTORNEY

Dec. 19, 1961   H. E. CRUMRINE ET AL   3,013,346
XEROGRAPHIC APPARATUS

Filed May 7, 1959   8 Sheets-Sheet 2

FIG. 2

INVENTOR.
Herbert E. Crumrine
Eugene T. Smith
BY
ATTORNEY

FIG. 3

INVENTOR.
Herbert E. Crumrine
Eugene T. Smith

Dec. 19, 1961  H. E. CRUMRINE ET AL  3,013,346
XEROGRAPHIC APPARATUS

Filed May 7, 1959  8 Sheets-Sheet 6

INVENTOR.
Herbert E. Crumrine
Eugene T. Smith
BY
ATTORNEY

United States Patent Office 3,013,346
Patented Dec. 19, 1961

3,013,346
XEROGRAPHIC APPARATUS
Herbert E. Crumrine and Eugene T. Smith, Rochester, N.Y., assignors to Xerox Corporation, a corporation of New York
Filed May 7, 1959, Ser. No. 811,733
5 Claims. (Cl. 35—13)

This invention relates to the field of xerography and, particularly, to improved apparatus for use in demonstrating the principles of xerography.

In the process of xerography, for example, as disclosed in Carlson Patent 2,297,691, issued October 6, 1942, a xerographic plate comprising a photoconductive insulating layer on a conductive backing is given a uniform electric charge over its surface. The plate is then exposed to the subject matter to be reproduced, usually by conventional projection means. The exposure to light discharges the plate areas in accordance with the light intensity that reaches them. This in turn creates an electrostatic latent image in or on the surface of the plate. Development of this latent image is accomplished by cascading a finely divided electrostatically charged powder across the photoconductive insulating layer. The electroscopic powder is held thereon electrostatically in a pattern corresponding to the electrostatic latent image.

From the nature of the xerographic process it is apparent that the several steps of charging, exposing and developing a xerographic plate must be accomplished in the dark in order to prevent the discharge of the electrostatic charge formed on the plate. This requirement applies to the technique and apparatus disclosed by Carlson, as well as to all xerographic techniques and equipment that have evolved since that time.

Obviously, it is a relatively simple matter to provide suitable machine housings whereby the light sensitive steps of the process may be accomplished without exposure to visible light. However, because of this requirement, it is extremely difficult to explain the principles of xerography to those unskilled in the basic principles of physics. In addition, it has made research and development work extremely difficult in those areas in which visual observation of machine motions would be helpful. For example, in the construction of xerographic developing systems it is extremely helpful to witness the operation of machine components and developing material under actual operating conditions. Furthermore, in arriving at preferred compositions for developing materials, it is helpful to be able to observe the build-up of a xerographic powder image during the course of a cascade developing operation.

The principal object of the present invention is to demonstrate the several light-sensitive steps of the xerographic technique. A further object of the invention is to improve the construction of xerographic processing apparatus whereby the several component mechanisms thereof may be observed under actual operating conditions. A further object of the invention is to improve xerographic developing apparatus whereby the action of developing material and the formation of a xerographic powder image may be observed under operating conditions.

These and other objects of the invention are attained by means of an improved xerographic processing apparatus wherein the steps of charging, exposing and developing a xerographic plate, as well as other steps incident thereto, are accomplished within a housing that excludes light rays to which the xerographic plate is sensitive, but is illuminated by light rays from that portion of the spectrum to which xerographic plates are normally insensitive. More specifically, since xerographic plates in general use are relatively insensitive to red light, the machine housing is provided with a ruby window whereby machine operations may be viewed exteriorly of the machine by the operator. In addition, the several machine elements are arranged in a fashion to make them readily viewable from the operator's position.

A preferred form of the invention is disclosed in the appended drawings, in which.

In the preferred embodiment of the invention shown in the drawings, the xerographic demonstrating apparatus 10 includes a box-like frame structure comprising vertical side members 21 which conveniently may be formed of angle iron that are supported in a rectangular base assembly 22 and, in turn, support a similar rectangular roof assembly 23. The several structural members are integrally secured and serve to support the several operating components of the xerographic apparatus as well as panel members 24 through 27, inclusive, that are fixed to the frame and serve to exclude exterior light from the operating apparatus. Front panel member 24 includes the start switch S–1 and an opening for supporting a ruby glass window 29 of such dimension that the entire operation of the apparatus within the enclosure may be viewed from the exterior of the machine.

Within the framelike structure are supported the several elements of the xerographic processing system as well as a projector device 30 for projecting a desired image onto a xerographic plate 11. The xerographic apparatus includes means for charging, exposing, developing and brush cleaning a xerographic plate.

Specifically, a xerographic plate 11 is supported on a carriage member 40 that comprises a frame assembly having rollers 41 that ride on rails 42 supported at an angle in the frame of the machine. An upper rail 43 is provided to retain carriage assembly 40 securely on its supporting rails. The particular arrangement of rails 42 and 43 is such that carriage assembly 40 can be moved upwardly and downwardly on the rails by means of a reversible motor M–4 which is effective, through sprocket 46, belt 47, and sprocket 48, to drive chains 49 and 50 supported for movement on the underside of the rail assembly. The path of movement of the carriage assembly is such that the plate is caused to pass through a cleaning station, a charging station, and an exposure station, at which the plate is also developed.

The brush cleaner assembly 60 is positioned over the rails 42 and 43 and approximately midway between the ends of the rails. Two rotary brushes 61 and 62 are driven by a brush cleaner motor M–1 by means of motor pulley 64, belt 65, brush pulleys 66 and idler 67. The said assembly is enclosed in a housing 68 and supported by hinge 69 which allows the whole mechanism to swing away from the cleaning station.

During cleaning the developer is drawn off through the flexible hose 81 and into the dust collector 80 by means of the dust collector motor M–3 and fan, not shown.

The charging station is immediately above the brush cleaner station. Charging is accomplished by means of a conventional scorotron 12. Said scorotron 12 is in most respects identical to that shown in Walkup Patent No. 2,777,957, has one or more corona discharge electrodes and is substantially enclosed within a shielding member. Immediately above the scorotron is a white light L–3. The scorotron may be used to charge the plate both negatively and positively. Both the white light and the scorotron are enclosed in a housing 70 which is in turn attached to the plate cleaner housing 68.

At the upper end of travel of the plate carriage is located the exposure station. The exposure station is also the developer station. Exposure is accomplished by means of a conventional projector 30 which projects an image onto the xerographic plate 11. The projector is turned on automatically by microswitch LS–1 when the plate carriage reaches the upper end of its run.

After exposure the plate is automatically developed. The development system 90 is composed of a bucket conveyor 91 driven by the bucket conveyor motor M–2 by means of sprocket 93, sprocket chain 94, and conveyor sprocket 95.

The conveyor motor M–2 drives wheel 97, conveyor belt 98 and conveyor buckets 99. The conveyor system is completely enclosed in a housing 101. The developer material 14 is carried up the bucket conveyor 91 by means of buckets 99 and is dropped into the developer chute 102 which is in turn connected to the developer hopper 103. At the bottom of the developer hopper is the hopper gate 104. When the developer gate 104 is opened, developer 14 is allowed to cascade across the plate 11 and into the developer tray 105. Baffle plate 106 is raised during development. The hopper gate 104 is opened and closed by means of hopper gate motor 107 and linkage 108. The developer is carried back into the conveyor system by means of the lower developer chute 109. A gate 110 is provided at the bottom of the developer housing for removing the developer from the bucket conveyor system. Fresh developer is poured into the hopper through door 111 (FIG. 2).

Figure 8:
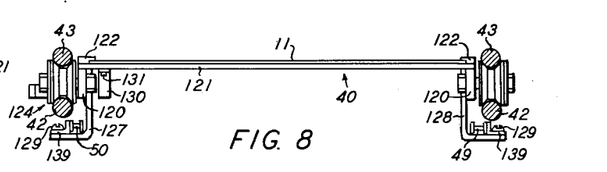
FIG. 8 is a front view of the plate carriage.
Figure 9:
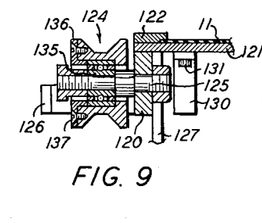
FIG. 9 is a section of one of the plate carriage wheels.

The plate carriage 40 shown in FIGS. 5 through 8, inclusive, is composed of the following elements. Two side plates 120 are secured to a top plate 121 by means of screws (not shown). A xerographic plate 11 is fastened to the top plate 121 by means of two members 122 and screws 123. Wheels 124 are fastened by bolts 125 to side plates 120. A sectioned drawing, FIG. 8, is provided which shows the construction of one of the wheels 124. A cam plate 126 is fastened to side plate 120 and is used to actuate microswitches LS–1 and LS–2, shown in FIG. 2. The plate carriage 40 is also provided with two angle members 127 and 128 which are fastened to chains 49 and 50 by means of screws 129 and angle fasteners 139. Angle member 130 fastened to top plate 121 by cap screw 131 actuates baffle plate 106, FIG. 3, when it strikes lever 132. Wheel assembly 124 is composed of bolt 125, nut 133, wheel 134, bearing 135, wheel rim 136 and rim screws 137. Between the side plate 120 and bearing 135 is spaced 138.

Figure 1:
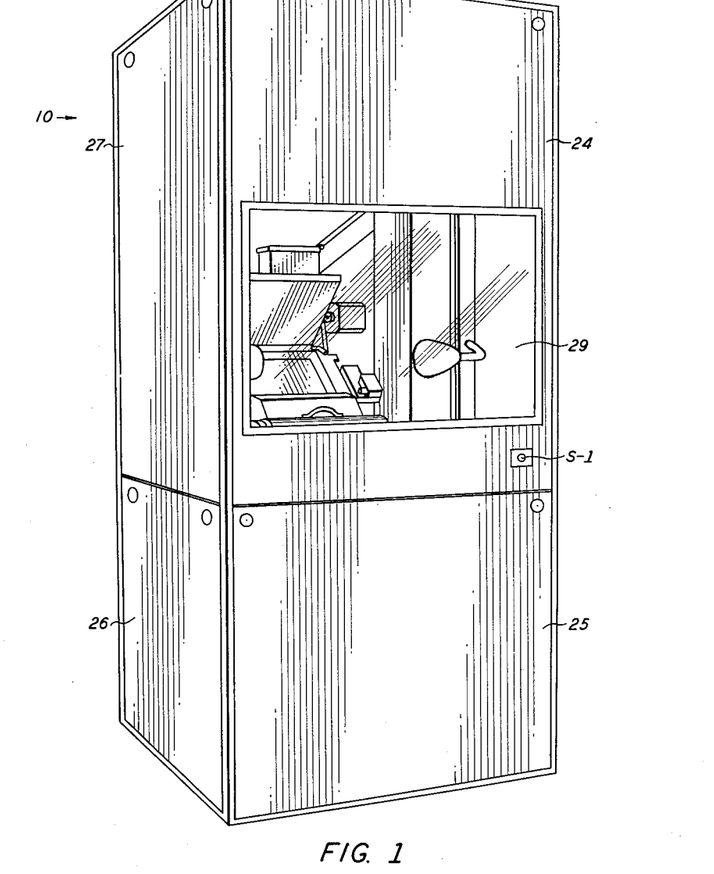
FIG. 1 is a perspective view of the apparatus of the invention, with covers.
Figure 2:
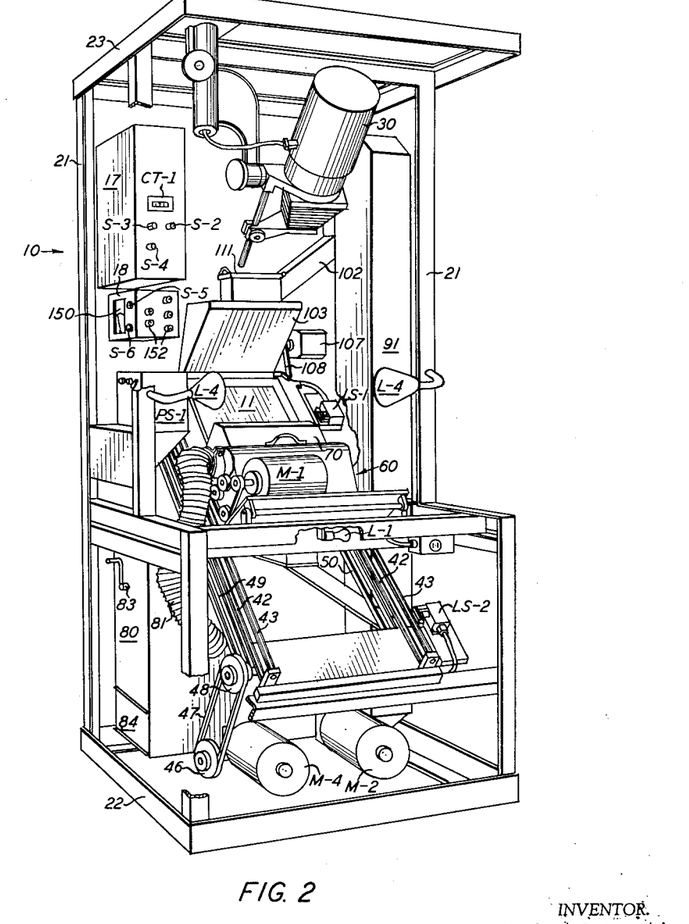
FIG. 2 is a perspective view of the apparatus of the invention, with covers removed.
Figure 3:
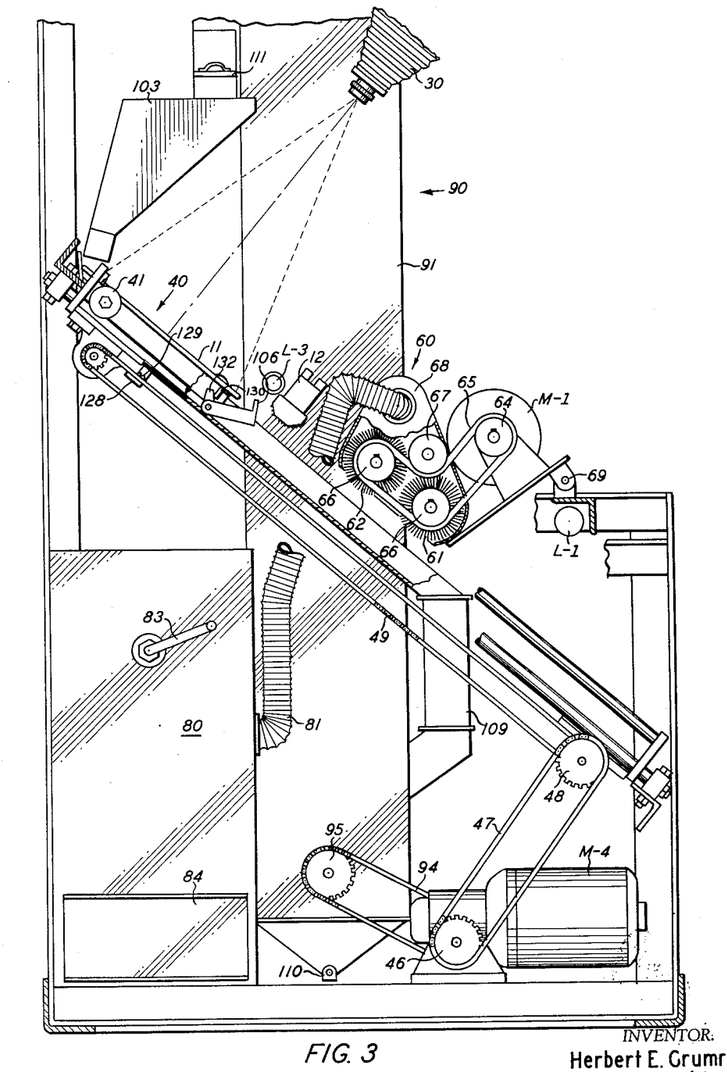
FIG. 3 is a left side elevation of the apparatus.
Figure 4:
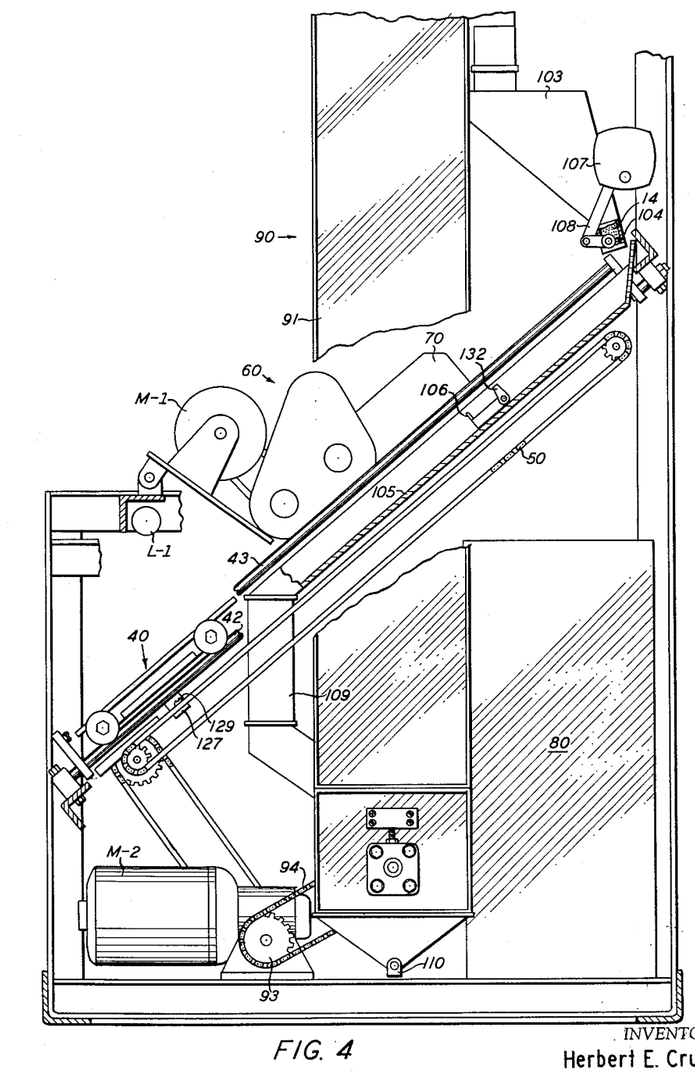
FIG. 4 is a right side elevation of the apparatus.
Figure 5:
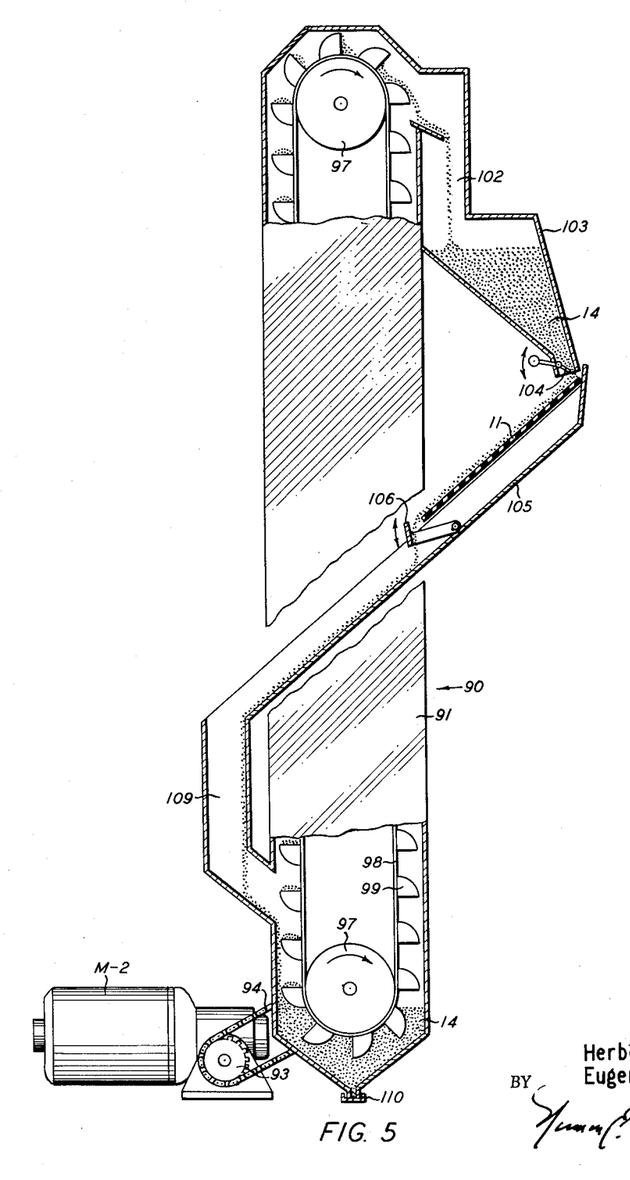
FIG. 5 is a right side elevation of the developing system, partly in section.
Figures 6, 7:
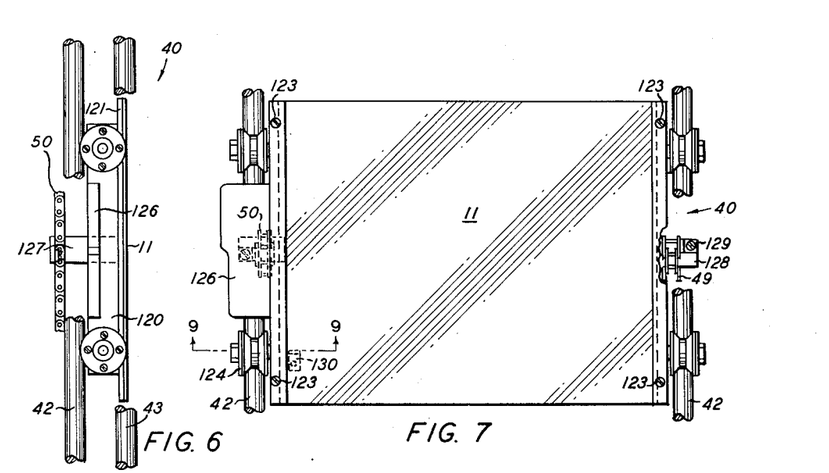
FIG. 6 is a side view of the plate carriage.
FIG. 7 is a top view of the plate carriage.

The following components are found in FIG. 2. The programmer control box 17 has a counter CT–1, two plate motion control buttons, up S–3 and down S–2, and dump developer button S–4. This dump button starts hopper motor 107 which opens hopper gate 104 by means of linkage 108 and dumps the developer into tray 105. Under the programmer control box is located the high voltage test box 18. On the left side are located the meter 150 and high voltage power supply test switches S–5 and S–6. On the front are terminals 152 for checking high voltage power supply adjustments.

The high voltage power supply PS–1 is also located on the left side of the machine. Two ruby lights L–4 are used to illuminate the plate during development. The dust collector 80 has a filter shaking handle 83 and a clean-out cover 84. Discharge light L–1 is located on a cross member under the plate cleaner motor.

*System operation*

Figure 10:
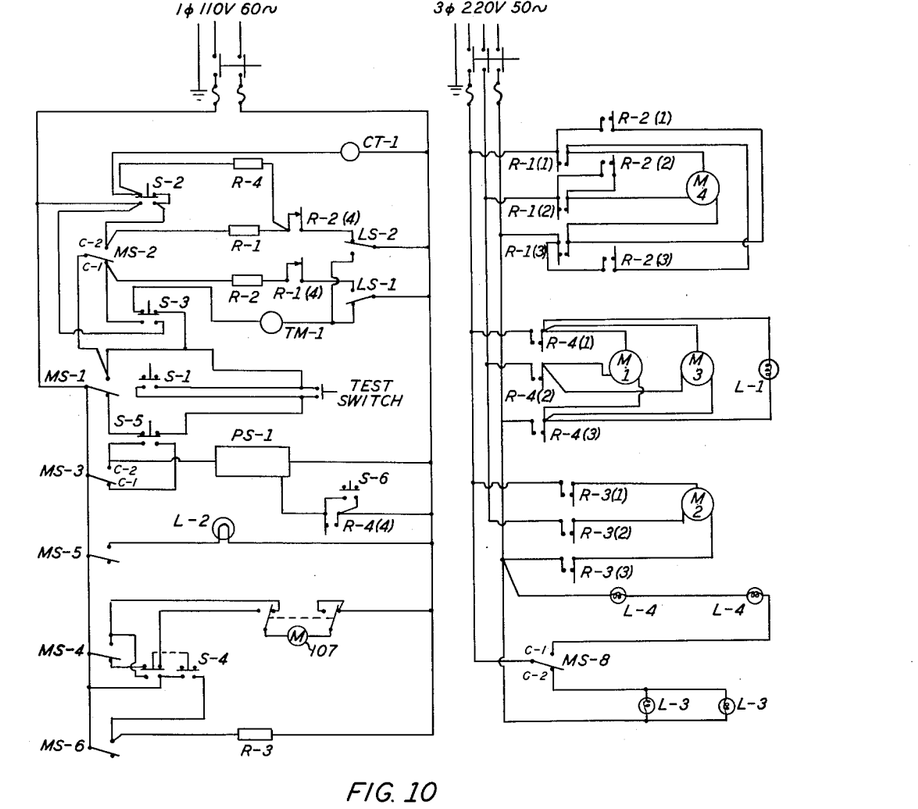
FIG. 10 is a schematic wiring diagram of the electrical system of the invention.

The following is a detailed description of the operation of the invention. Normally the machine is automatic in operation after the "start" switch is closed; however, there are six manually operated switches which require a more detailed description. Refer to FIGURE 10, schematic wiring diagram, and FIG. 11, timing chart.

(1) Start switch S–1 starts automatic cycling of the machine by starting timer motor on the program timer.

(2) Push button switch S–2 operates plate carriage "down."

(3) Push button switch S–3 operates plate carriage "up."

(4) Push button switch S–4 dumps developer and operates conveyor motor.

(5) Push button switch S–5 operates the power supply-primary.

(6) Push button switch S–6 operates the negative relay in high voltage.

Figure 11:
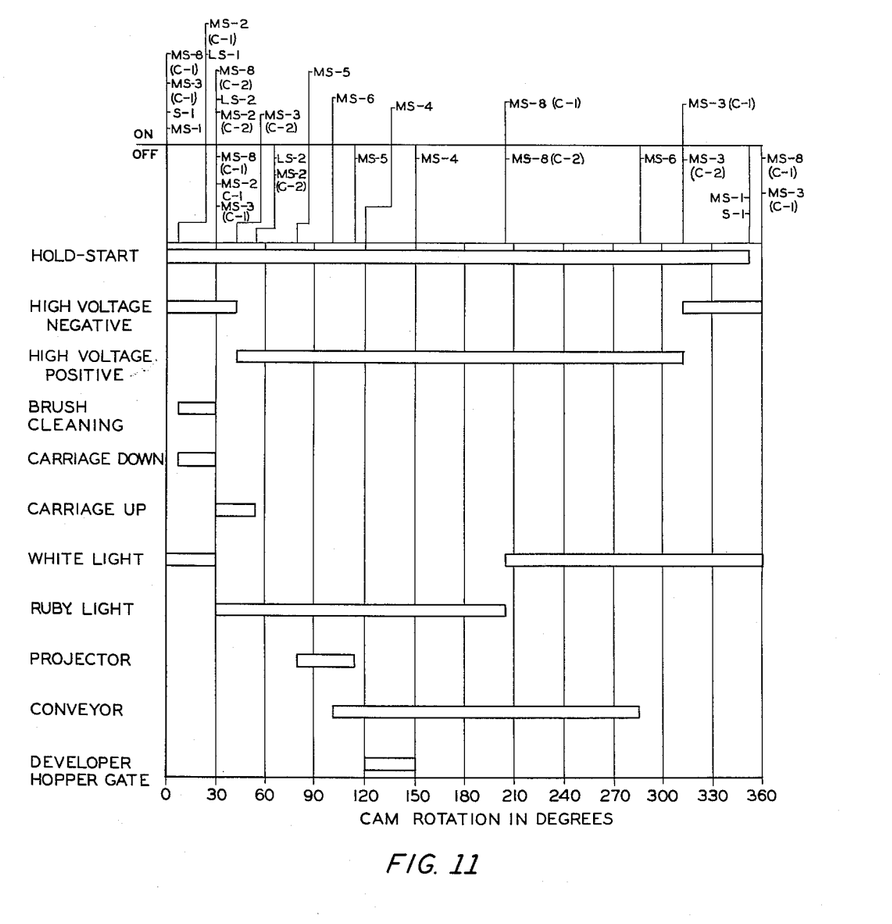
FIG. 11 is a timing chart.

Automatic operation is initiated by depressing S–1; this starts timer motor TM–1 which runs the program timer. As the program timer runs, seven switches are actuated at specified intervals by seven cams. FIG. 11, timing chart, shows the operation of this timing device. One revolution of the programmer taking approximately 40 seconds represents one complete cycle of operation of the machine.

When the machine stops at the end of a cycle, the plate carriage is in the "up" position at the exposure and development station and the white lights remain on until the next cycle of operation.

Immediately after the programmer starts, the high voltage power supply PS–1 is turned on to give a negative charge. The carriage motor M–4 starts 7° of cam rotation later and the plate carriage 40 starts down the rails. The developer baffle 106 is immediately retracted allowing the plate carriage to pass over it, and limit switch LS–1 is opened which in turn starts brush cleaning motor M–1 and dust collector motor M–3 and turns on discharge lamp L–1. As the xerographic plate 11 on carriage assembly 40 passes under the scorotron 12 it is sprayed with a negative charge which allows the powder image to be removed more easily. The plate then passes under the brush cleaning assembly 60 and is cleaned and then continues to the end of travel where limit switch LS–2 is actuated. LS–2 opens relay R–4 which in turn stops brush cleaning motor M–1 and dust collector motor M–3 and turns off the discharge lamp L–1. MS–8 also turns off white lights L–3 and turns on ruby lights L–4, and MS–2 reverses carriage motor M–4, starting the plate carriage back up the rails.

The plate 10 passes under the plate cleaner brushes which are not rotating, and then under the scorotron 12 where it is given a positive charge. At the upper end of the plate carriage travel developer baffle plate 106 is automatically lifted and LS–1 is actuated which stops the carriage drive motor M–4 by deactivating relay R–2. Timer switch MS–5 is activated which turns on the projector lamp L–2 which in turn exposes the xerographic plate 10 for approximately 10% of cycle. Conveyor motor M–2 is started by timer switch MS–6 which actuates relay R–3. Soon after the conveyor motor starts timer switch MS–4 is actuated and developer hopper gate motor 107 opens hopper gate 104 and developer is allowed to cascade across the xerographic plate and the latent image is developed. A white developer is used so that the image can be easily seen. After the hopper gate 104 is closed, the ruby lights L–4 are turned off and the white lights L–3 are turned on by timer switch MS–8. The conveyor motor M–2 continues to operate until all of the developer 14 is returned to the developer hopper 103 and shortly thereafter the timer motor is shut off and the cycle stops. The white viewing lights L–3 remain on until a new cycle is initiated.

Since many changes could be made in the above construction and many apparently widely different embodiments of this invention could be made without departing from the scope thereof, it is intended that all matter contained in the drawings shall be interpreted as illustrative and not in a limiting sense.

What is claimed is:

1. An apparatus for demonstrating xerographic techniques including the combination of a xerographic plate having a photoconductive layer on a conductive backing, said photoconductive layer being sensitive to a portion of the visible spectrum and substantially insensitive to the remaining portion of the visible spectrum; a carriage for supporting the xerographic plate; inclined ways for supporting said carriage throughout a predetermined path of movement; a plate-charging apparatus and an image-projecting apparatus each arranged in the path of movement of the plate carriage; actuating means for driving the plate carriage successively past the plate-charging apparatus, and for positioning the plate at an image-projecting location relative to the image projecting apparatus, means for developing a latent electrostatic image on the plate; a light shield enclosing the foregoing apparatus, and a transparent window in said light shield arranged in a manner to permit viewing of the several steps of the xerographic process, said window being formed of a material to prevent entry of ambient light to which the xerographic plate is sensitive; said inclined ways being so arranged within said light shield, and said plate charging, image projecting, and image developing apparatus being so arranged relative to said inclined ways, whereby the operation of such devices may be viewed through said transparent window.

2. An apparatus for demonstrating xerographic techniques including the combination of a xerographic plate having a photoconductive layer on a conductive backing, said photoconductive layer being sensitive to a portion of the visible spectrum and substantially insensitive to the remaining portion of the visible spectrum; a carriage for supporting the xerographic plate; inclined ways for supporting said carriage throughout a predetermined path of movement; a plate-charging apparatus and an image-projecting apparatus each arranged in the path of movement of the plate carriage; actuating means for driving the plate carriage past the plate-charging apparatus, and for positioning the plate at an image-projecting location relative to the image projecting apparatus; means for developing a latent electrostatic image on the plate; a light shield enclosing the foregoing apparatus, a transparent window in said light shield arranged in a manner to permit viewing of the several steps of the xerographic process, said window being formed of a material to prevent entry of ambient light to which the xerographic plate is sensitive; said inclined ways being so arranged within said light shield, and said plate charging, image projecting, and image developing apparatus being so arranged relative to said inclined ways, whereby the operation of such devices may be viewed through said transparent window; and means for illuminating the interior of the light shield with a light source from that portion of the spectrum to which the xerographic plate is insensitive.

3. An apparatus for demonstrating xerographic techniques including the combination of a xerographic plate having a photoconductive layer on a conductive backing, said photoconductive layer being sensitive to a portion of the visible spectrum and substantially insensitive to the remaining portion of the visible spectrum; a carriage for supporting the xerographic plate; inclined ways for supporting said carriage throughout a predetermined path of movement; a plate-cleaning apparatus, a plate-charging apparatus, and an image-projecting apparatus each arranged in the path of movement of the plate; actuating means for driving the plate carriage successively past the plate-cleaning apparatus and the plate-charging apparatus, and for positioning the plate at an image-projection location relative to the image projecting apparatus; means for developing a latent electrostatic image on the plate; a light shield enclosing the foregoing apparatus, a transparent window in said light shield arranged in a manner to permit viewing of the several steps of the xerographic process, said window being formed of a material to prevent entry of ambient light to which the xerographic plate is sensitive; said inclined ways being so arranged within said light shield, and said plate cleaning, plate charging, image projecting, and image developing apparatus being so arranged relative to said inclined ways, whereby the operation of such devices may be viewed through said transparent window; and means for illuminating the interior of the light shield with a light source from that portion of the spectrum to which the xerographic plate is insensitive.

4. An apparatus for demonstrating xerographic techniques including the combination of a xerographic plate having a photoconductive layer on a conductive backing, said photoconductive layer being sensitive to a portion of the visible spectrum and substantially insensitive to the remaining portion of the visible spectrum; a carriage for supporting the xerographic plate; inclined ways for supporting said carriage throughout a predetermined path of movement; a plate cleaning apparatus, a plate-charging apparatus and an image-projecting apparatus each arranged in the path of movement of the plate; actuating means for driving the plate carriage successively past the plate-cleaning apparatus and the plate-charging apparatus, and for positioning the plate at an image-projecting location relative to the image projecting apparatus; means for developing a latent electrostatic image on the plate; said last recited means including a hopper for containing developing material, said hopper being situated adjacent the xerographic plate at its image-projecting location, means for releasing developing material from said hopper in timed relation to the operation of the image-projecting apparatus, and means for collecting released developing material and returning it to the hopper after a developing operation; a light shield enclosing the foregoing apparatus, and a transparent window in said light shield arranged in a manner to permit viewing of the several steps of the xerographic process, said window being formed of a material to prevent entry of ambient light to which the xerographic plate is sensitive; said inclined ways being so arranged within said light shield, and said plate cleaning, plate charging, image projecting, and image developing apparatus being so arranged relative to said inclined ways, whereby the operation of such devices may be viewed through said transparent window.

5. An apparatus for demonstrating xerographic devices for charging, exposing, developing and cleaning a xerographic plate, said plate including a photoconductive layer on a conductive backing wherein the photoconductive layer is sensitive to a portion of the visible spectrum and is substantially insensitive to the remaining portion of the visible spectrum, said apparatus including a light shield for enclosing xerographic processing devices and a transparent window in said light shield, said window being formed of a material to prevent entry of ambient light to which the xerographic plate is sensitive, wherein the apparatus within the light shield includes a carriage for supporting a xerographic plate, inclined ways for supporting said carriage throughout a predetermined path of movement within the field of view provided by said window whereby the operation of the xerographic processing devices may be observed exteriorly of the machine, and a plurality of xerographic processing devices arranged in cooperative relation to the xerographic plate moved on said inclined ways, said processing devices including a charging apparatus for applying a uniform electrostatic charge to the xerographic plate surface at a charging station, an image projecting apparatus for projecting a light image onto the xerographic plate at an exposure station to form an electrostatic latent image on the plate corresponding to the light image, a developing apparatus arranged adjacent the exposure station for cascading developing material over the xerographic plate to form a xerographic powder image on the plate corresponding to the electrostatic latent image, and a plate cleaning apparatus arranged at a plate cleaning station for removing the powder image from the xerographic plate, drive means for advancing the plate carriage to move said plate past the plate charging station and for positioning the plate at the exposure station and for moving the plate past the plate cleaning station, and timing means for controlling the operation of the plate carriage drive means to effect plate charging, plate exposure, image developing, and plate cleaning in timed relationship.

References Cited in the file of this patent

UNITED STATES PATENTS

| 903,052 | Brown | Nov. 3, 1908 |
| 988,421 | Willyerd | Apr. 4, 1911 |
| 1,050,843 | Monk | Jan. 21, 1913 |
| 2,624,652 | Carlson | Jan. 6, 1953 |

FOREIGN PATENTS

| 4,967 | Great Britain | 1881 |
| 201,301 | Australia | 1956 |

OTHER REFERENCES

"Xerography Today" by Dessaver, Mott and Bogdonoff, published in Photographic Engineering, vol. 6, No. 4, 1955, pages 250–268 inclusive (page 252 is being relied on).

"Xerography: A New Principle of Photography and Graphic Reproduction" by Schaffert and Oughton, published in the Journal of the Optical Society of America, vol. 38, No. 12 December 1948, pages 991–998, inclusive (page 994 is being relied on).